United States Patent
Vogel et al.

(10) Patent No.: US 8,769,136 B2
(45) Date of Patent: Jul. 1, 2014

(54) LOAD BALANCING OF DATA TRANSMISSIONS

(75) Inventors: Andreas Vogel, Rauenberg (DE); Dominic Hehn, Speyer (DE)

(73) Assignee: SAP AG, Walldorf (DE)

(*) Notice: Subject to any disclaimer, the term of this patent is extended or adjusted under 35 U.S.C. 154(b) by 762 days.

(21) Appl. No.: 12/907,700

(22) Filed: Oct. 19, 2010

(65) Prior Publication Data
US 2012/0096178 A1    Apr. 19, 2012

(51) Int. Cl.
*G06F 15/16*    (2006.01)
*H04L 12/00*    (2006.01)
*H04L 12/40*    (2006.01)
*H04L 29/08*    (2006.01)

(52) U.S. Cl.
CPC ............ *H04L 12/00* (2013.01); *H04L 12/4015* (2013.01); *H04L 67/1002* (2013.01)
USPC .......................................... 709/230; 370/229

(58) Field of Classification Search
CPC .. H04L 12/00; H04L 12/4015; H04L 67/1002
USPC .................... 709/230; 370/229–240; 718/105
See application file for complete search history.

(56) References Cited

U.S. PATENT DOCUMENTS

| | | | | |
|---|---|---|---|---|
| 5,805,569 | A * | 9/1998 | Lindqvist et al. | 370/229 |
| 6,683,568 | B1 * | 1/2004 | James et al. | 342/387 |
| 6,934,297 | B1 * | 8/2005 | Bensaou et al. | 370/445 |
| 7,660,252 | B1 * | 2/2010 | Huang et al. | 370/235 |
| 8,180,917 | B1 * | 5/2012 | Yan et al. | 709/234 |
| 2004/0246976 | A1 * | 12/2004 | Balakrishnan et al. | 370/395.41 |
| 2007/0041331 | A1 * | 2/2007 | Ma et al. | 370/252 |
| 2009/0252038 | A1 * | 10/2009 | Cafiero et al. | 370/235 |
| 2013/0064090 | A1 * | 3/2013 | Maenpaa et al. | 370/235 |

* cited by examiner

*Primary Examiner* — Joseph E Avellino
*Assistant Examiner* — James Conaway
(74) *Attorney, Agent, or Firm* — Schwegman, Lundberg & Woessner, P.A.

(57) ABSTRACT

In an embodiment, a method is provided for transmitting data. In this method, a number from a sequence of numbers is identified, and each number from the sequence is associated with a time interval. A random number is generated and it is compared with the identified number. In reference to the time interval associated with the identified number, transmission of the data to the electronic device is initiated based on the comparison.

18 Claims, 9 Drawing Sheets

LOAD BALANCING OF DATA TRANSMISSIONS

FIELD

The present disclosure relates generally to data transmissions. In an embodiment, the disclosure relates to load balancing of data transmissions.

BACKGROUND

Many client applications are programmed to transmit data to a central server periodically. For example, all client computers in an enterprise system may be programmed to transmit diagnostic data to a central server daily at midnight. However, in large systems with thousands or millions of computers, a central server may not have the resources to handle all the data transmitted simultaneously. Furthermore, a computer network forwarding the data may not have the bandwidth to handle the large amount of data if they are all transmitted simultaneously.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide various techniques for load balancing transmission of data. In general, a decision to transmit data by a particular electronic device depends on comparisons of some number with a randomly generated number. As explained in more detail below, this number that is being compared may be selected from a sequence of increasing or decreasing numbers.

Figure 1:
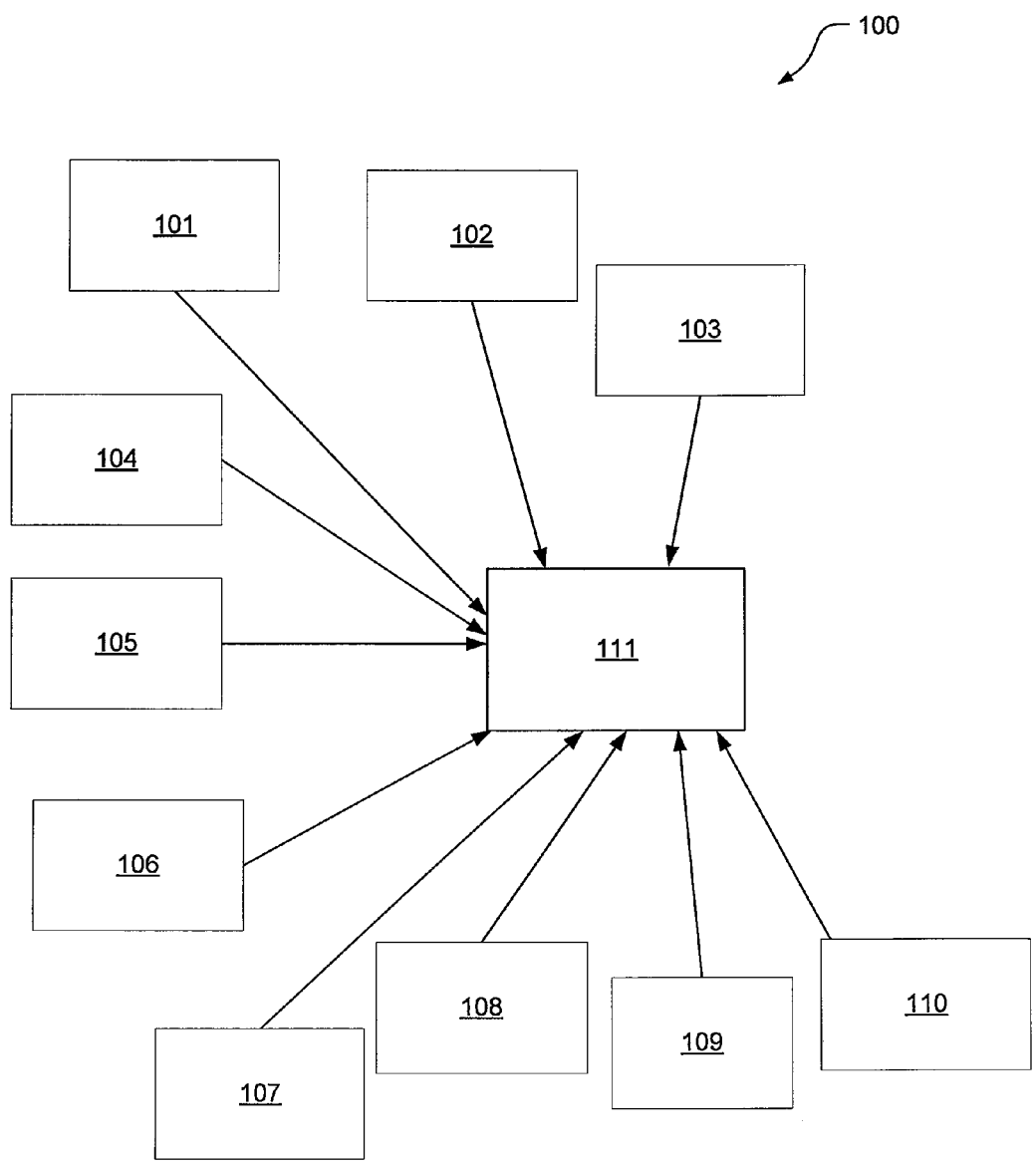
FIG. 1 depicts a block diagram of a system, consistent with an example embodiment, that uses load-balancing techniques for data transmissions.

FIG. 1 depicts a block diagram of a system 100, consistent with an example embodiment that uses load-balancing techniques for data transmissions. The system 100 includes electronic devices 101-110 that are in communication with electronic device 111. In general, each electronic device from the various electronic devices 101-110 is a physical entity that accomplishes its purpose electronically. Examples of electronic devices include electronic components (e.g., microprocessors and integrated circuits), computers, mobile phones, set-top boxes, storage devices, routers, switches, videogame consoles, televisions, and other electronic devices. Such electronic devices 101-111 may be included in a variety of different systems, such as a client-server system, a network system, a television broadcast system, and a computer system, some of which are explained in detail below.

In the example depicted in FIG. 1, the electronic devices 101-110 are configured to transmit data to the electronic device 111. However, the electronic device 111 may not be designed to handle a large amount of data if all the electronic devices 101-110 transmit data simultaneously to the electronic device 111. Alternatively, the communication channel that connects the electronic device 111 all the other electronic devices 101-110 may not have sufficient bandwidth to accommodate the large amount of data. As a result, each electronic device 101-110 uses a particular load-balancing technique in the transmission of data to the electronic device 111 such that all the electronic devices 101-110 do not all transmit data simultaneously to the electronic device 111. As explained in more detail below, this load-balancing technique enables transmission of data based on comparisons with a randomly generated number to prevent the simultaneous transmission of data by electronic devices 101-110. As also explained in more detail below, the probability of enabling transmission may be dependent on the passage of time.

Figure 2:
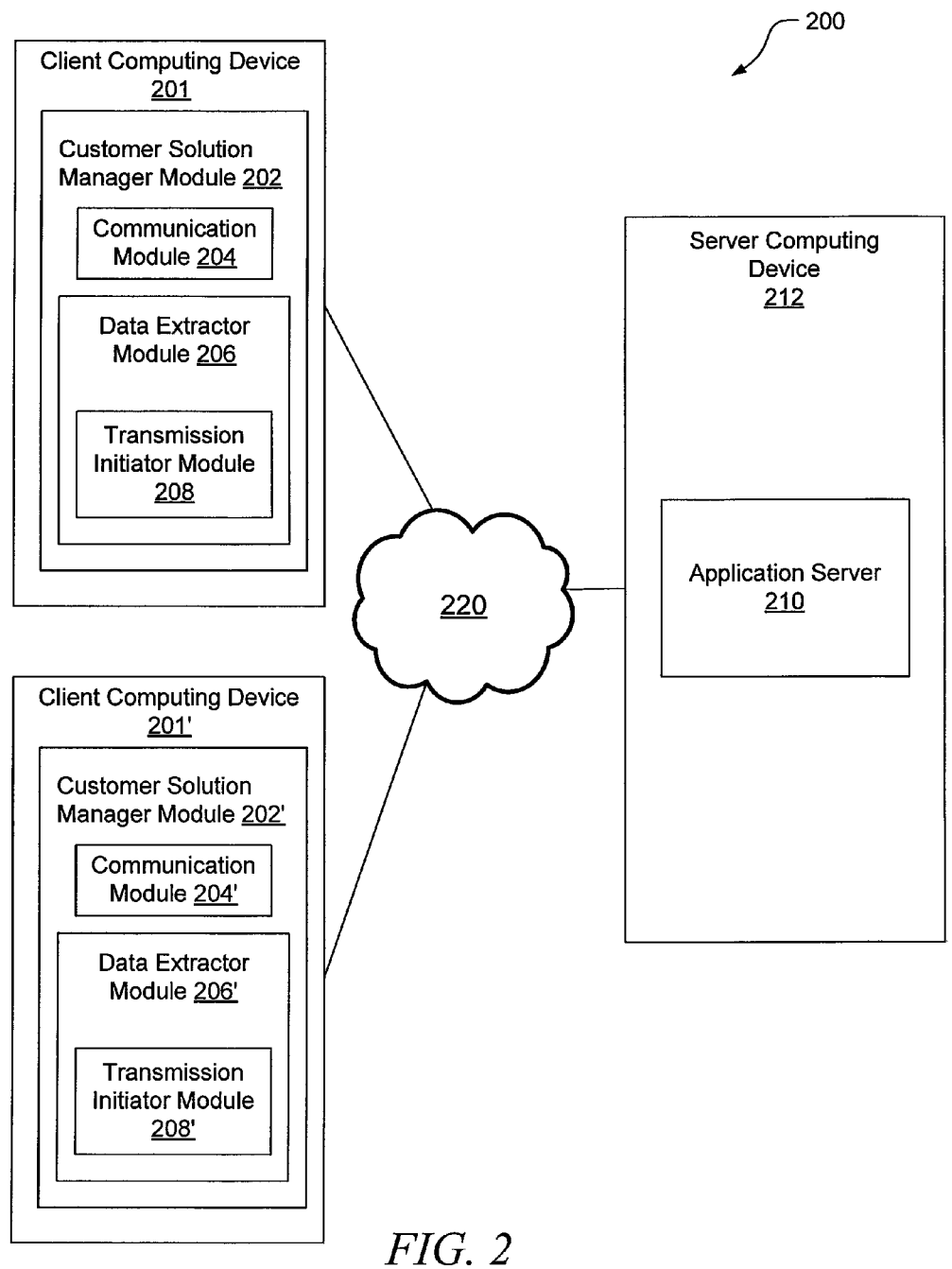
FIG. 2 depicts a block diagram of a client-server system, consistent with an example embodiment, that uses load-balancing techniques for data transmissions.

FIG. 2 depicts a block diagram of a client-server system 200, consistent with an example embodiment that uses load-balancing techniques for data transmissions. The client-server system 200 includes multiple client computing devices 201 and 201' that are in communication with a server computing device 212 by way of a computer network 220, which is a collection of interconnected computing devices (e.g., client computing devices 201, 201', and 212) that communicate utilizing wired or wireless mediums. Examples of computer networks include Local Area Networks (LANs) and/or Wide Area Networks (WANs), such as the Internet.

The server computing device 212 is configured to host an application server 210, which is dedicated to run specific applications and delivers these applications to the client computing devices 201 or 201'. The application server 210 may handle, for example, business logic and data access requests from the client computing devices 201 or 201'. Examples of application servers, such as the application server 210, include SAP NetWeaver Application Server, Advanced Business Application Programming (ABAP) Application Server, and Java Platform Enterprise Edition Server.

The client computing devices 201 and 201' are configured to run a variety of different applications, including Web browsers and business related applications (e.g., accounting applications, reporting applications, customer information management applications, and sales order applications). In the example depicted in FIG. 2, each client computing device 201 or 201' executes a customer solution manager module 202 or 202', which provides functionalities that cover various aspects of software deployment and operations to facilitate, for example, technical support for distributed systems. The customer solution manager module 202 or 202' may be a part of a desktop client application (not shown), which is also executed on the client computing device 201, that offers a unified environment for and a single point of entry to business applications.

In this example, each client computing device 201 or 201' is configured to transmit various data periodically to the application server 210. For example, each client computing device 201 or 201' can be configured to transmit diagnostic data to the application server 210 daily from 12:00 AM to 1:00 AM. In the example of the client computing device 201, the customer solution manager module 202 includes a data extractor module 206 that is configured to extract the data from the client computing device 201 and includes a communication module 204 that is configured to transmit the extracted data to the server computing device 212. In this embodiment, the data extractor module 206 includes a transmission initiator module 208. In a large client-server system 200 with, for example, 10,000 client computing devices, the application server 210 cannot receive all the data from all client computing devices simultaneously because the application server 210 has limited resources. Additionally, the computer network 220 may not have the bandwidth to handle the large amount of data being transmitted to the application server 210. Accordingly, each transmission initiator module 208 or 208' is configured to load-balance the transmission of data to the application server 210 such that all the client computing devices 201 and 201' do not simultaneously transmit data to the application server 210. As explained in more detail below, this load-balancing technique is based on comparisons with a randomly generated number.

Figure 3:
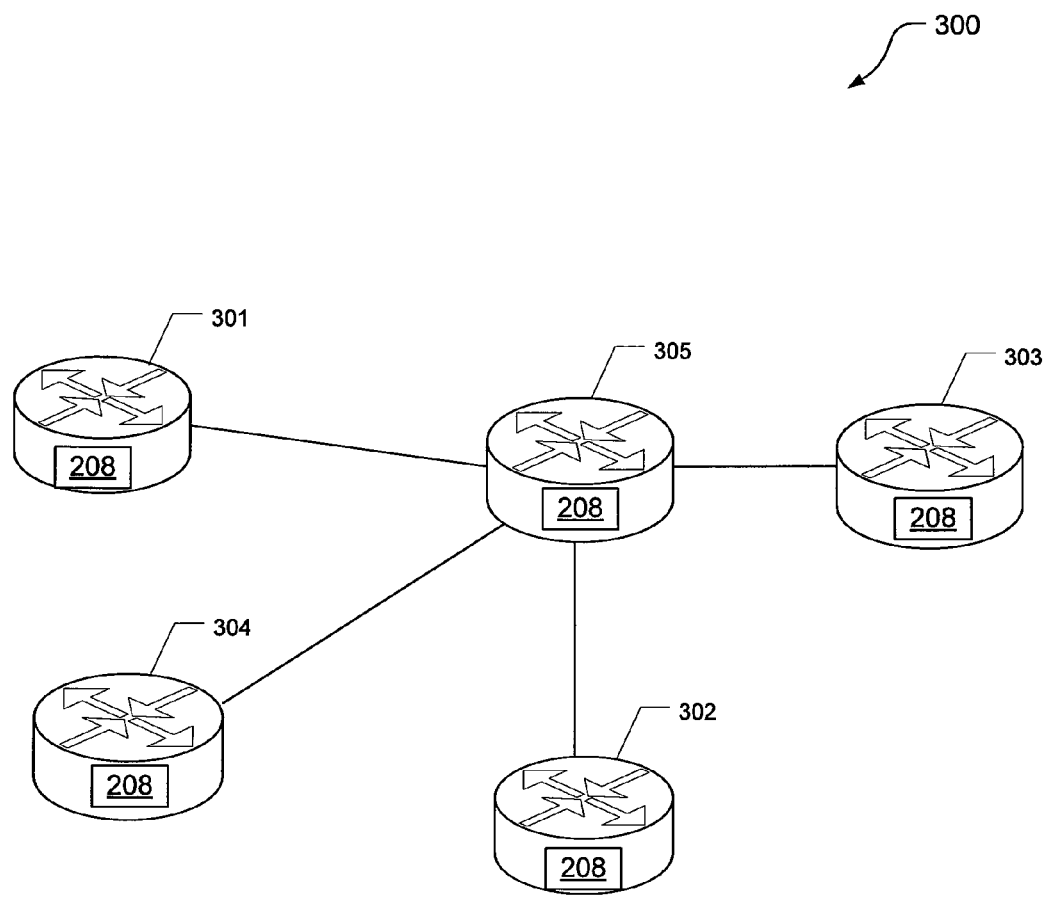
FIG. 3 depicts a diagram of a computer network, in accordance with another embodiment.

FIG. 3 depicts a diagram of a computer network 300, in accordance with another embodiment. The computer network 300 includes multiple routers 301-305, which are devices that allow packets of data to be moved between two points on the computer network 300. The routers 301-305 communicate with each other by way of routing protocols. Generally, a routing protocol is a protocol that specifies how routers 301-305 communicate with each other to disseminate Internet Protocol (IP) address prefixes and thereby allows the routers 301-305 to select routes for flows of IP packets.

In the example depicted in FIG. 3, the routers 301-304 are all configured to forward IP packets to router 305. Here, it may not be optimal for the router 305 to receive all the data from routers 301-304 simultaneously because, for example, the router 305 has limited resources to process all the data. Accordingly, in one embodiment, each router 301-305 also includes a transmission initiator module 208 that load balances the transmission of data such that all the routers 301-304 do not simultaneously transmit data to, for example, the router 305.

Figure 4:
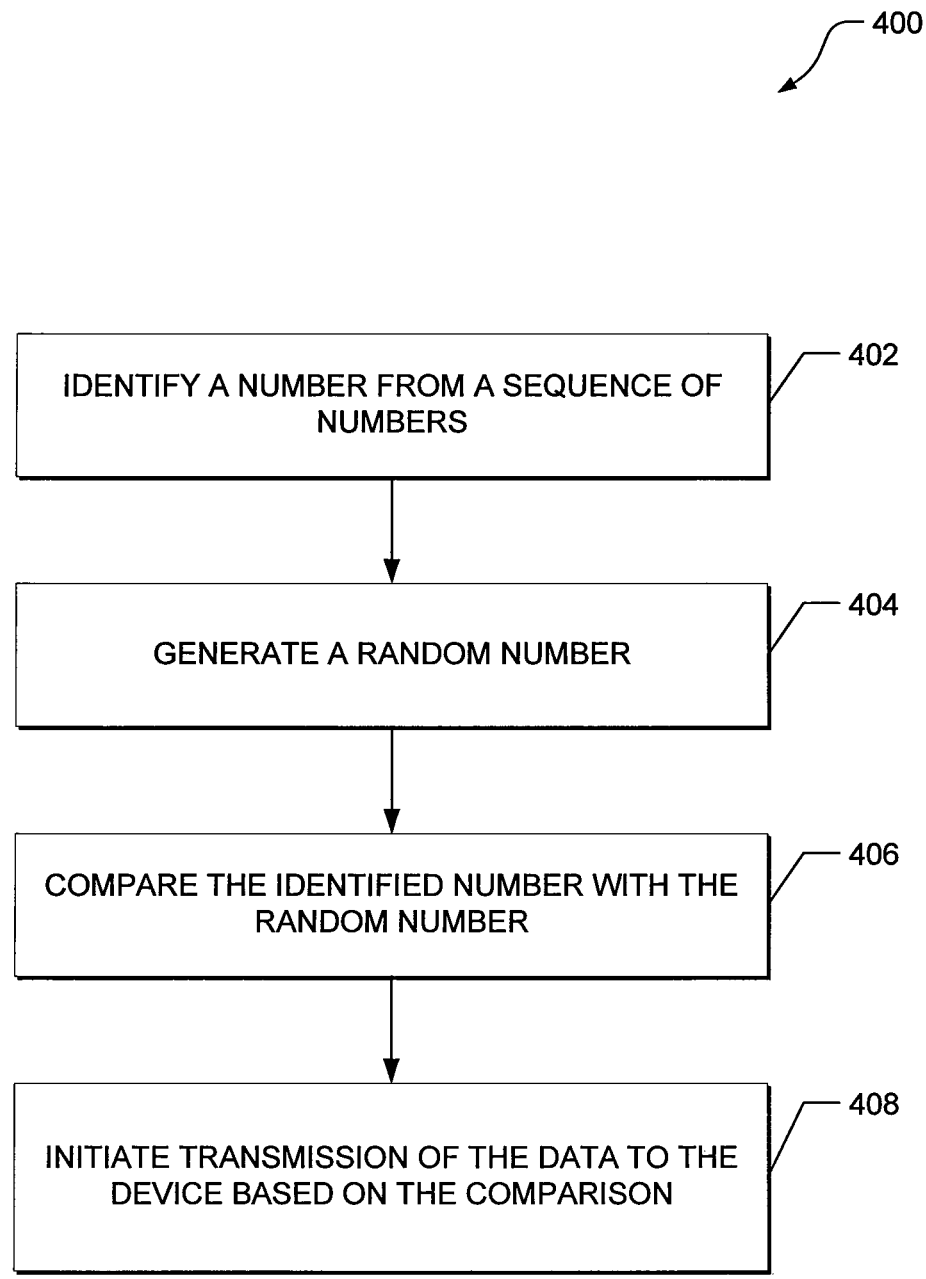
FIG. 4 depicts a flow diagram of a general overview of a method, in accordance with an embodiment, for transmitting data to a different electronic device.

FIG. 4 depicts a flow diagram of a general overview of a method 400, in accordance with an embodiment, for transmitting data to a different electronic device. The method 400, in one embodiment, may be implemented by the transmission initiator modules 208 and 208' and employed in the client computing devices 201 and 201' depicted in FIG. 2. As depicted in FIG. 4, a number from a sequence of numbers is identified at 402. As explained in more detail below, there are a number of different embodiments for identifying the number. Each number is associated with a particular time interval. As used herein, a "time interval" refers to a length of time that is used as a reference in initiating transmission of data. For example, a time interval may be 5 minutes where data transmission is initiated at every 5 minute interval. In another example, a time interval may be 10 minutes where data transmission is initiated at a few seconds after every 10 minute interval. The time interval can also vary such that, for example, data transmission may be initiated at 5 minutes, at 15 minutes thereafter, at 17 minutes thereafter, and at 6 minutes thereafter. Accordingly, the time interval is a time increment that is used as a reference in initiating data transmission.

A random number is generated at 404 and the identified number is compared with a random number at 406. Transmission of the data to a different electronic device is initiated at 408 based on this comparison. For example, as explained in more detail below, if the identified number is greater than the random number, then a transmission initiator module can initiate transmission of data. However, if the identified number is less than or equal to the random number, then the transmission initiator module can abort the transmission of data.

It should be appreciated that the transmission of data is made in reference to a time interval associated with the particular identified number. In other words, the timing of the transmission is synchronized with the time interval. For example, transmission of data can be initiated at the time interval. In another example, transmission of data can be initiated before the time interval. In yet another example, transmission of data can be initiated after the time interval.

Figure 5:
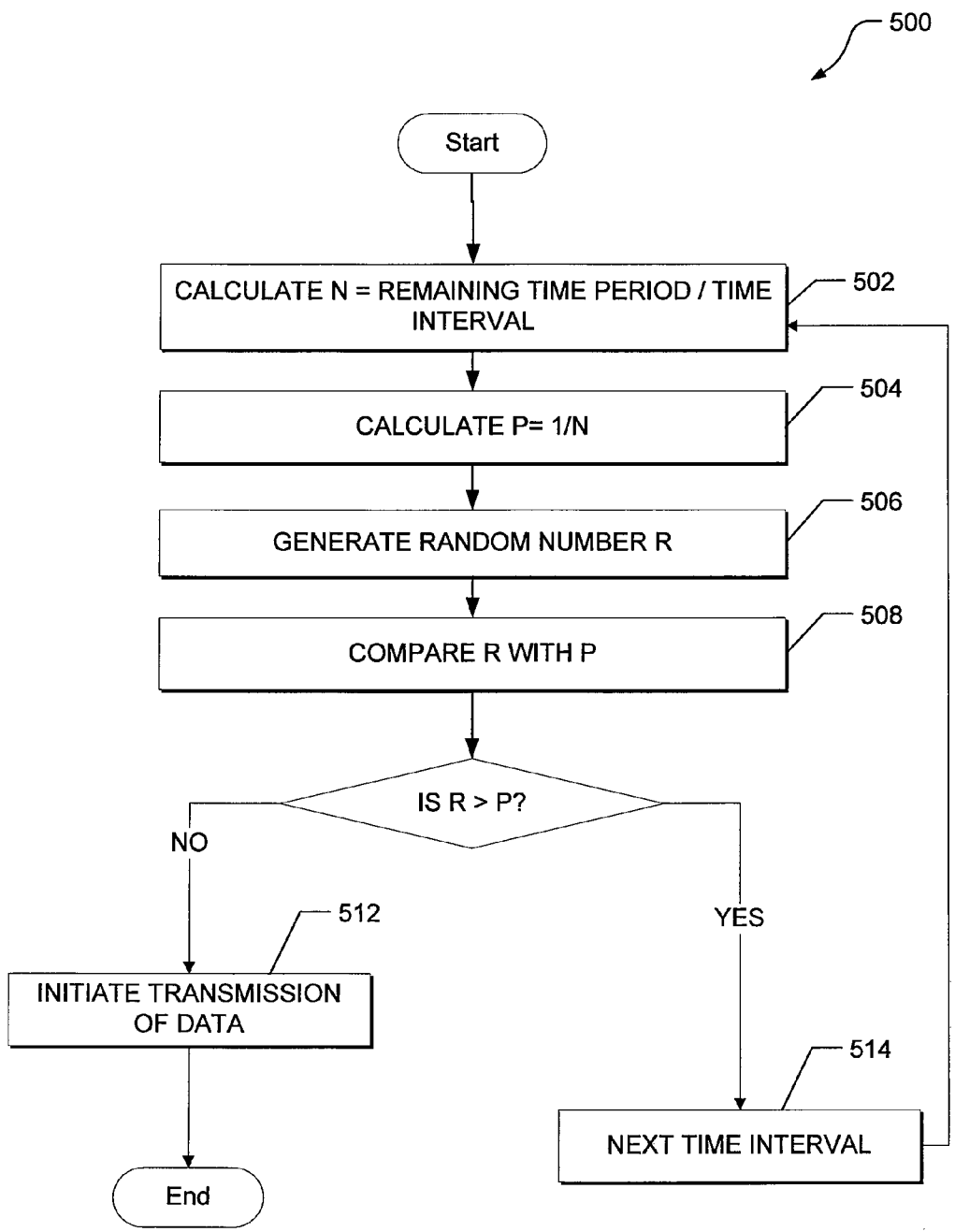
FIG. 5 depicts a flow diagram of a detailed method, in accordance with one embodiment, for transmitting data to a different electronic device.

FIG. 5 depicts a flow diagram of a detailed method 500, in accordance with one embodiment, for transmitting data to a different electronic device. Here, a number can be identified at 502 by calculating a number N based on a ratio of a remaining time period to a time interval:

$$N = \frac{\text{Remaining Time Period}}{\text{Time Interval}}$$

The remaining time period is the difference between an elapsed time and a total time period. The total time period is the total amount of time that is allocated to attempt to initiate data transmission. For example, a total amount of time may be 1 hour, and each transmission initiator module is configured to initiate data transmission within this 1 hour window. In another example, a total amount time may be 2 hours, and each transmission initiator module is configured to initiate data transmission within this 2 hour window. The elapsed time is the time that has elapsed within the total time period.

As an example, client computing devices can be configured to transmit data to particular server computing device within a one-hour window. Within this one-hour window, each client computing device is configured to attempt to initiate a data transmission at 5 minute intervals. If no time has elapsed within the one-hour window, then the remaining time period is equal to 60 minutes (60 minutes total time period −0 elapsed time). The number N is then equal to 12 (60 minutes/5 minutes). However, if 20 minutes have elapsed within the one-hour window, then the remaining time period is 40 minutes (60 minutes total time period −20 minutes elapsed time). The number N changes to 8 (40 minutes/5 minutes).

A probability P is then calculated at 504 based on an inverse of the ratio (or number N) calculated above. For example, if the number N is 12, then the probability is 0.08 (1/12). If the number N is 8, then the probability is 0.125

(1/200). In addition, a random number R is generated at 506. It should be noted that this random number R may be distributed between a variety of different ranges. In one example, the random number R may be a floating point number distributed between 0 and 1 (or 0<R<1).

With the random number, the probability P is compared with the random number R at 508. If the random number R is less than or equal to the probability P, then transmission of data is initiated at 512 and the method operation ends. However, if the random number R is greater than the probability P, then the transmission of data is aborted and the calculations of number N, probability P, and random number R are repeated for a next time interval at 514 until the end of the total time period. For example, if the random number R is 0.5 and the calculated probability P is 0.08, then the comparison will identify that R is greater than P and accordingly, abandon transmission of the data. However, if the random number R is 0.125 and the calculated probability P is also 0.125, then the comparison will identify that R is equal to P and accordingly, initiate transmission of the data to a different electronic device.

It should be noted that as the method operations 502 and 504 repeat for a next time interval, the probability P will increase as it approaches the total time period. At the end of the total time period, the remaining time period is 5 minutes (if time interval is 5 minutes). The number N is therefore 1 (5/5), as is the probability P. If the random number R is distributed between 0 and 1, then the random number R will always be less than the probability P=1 at the end of the total time period. Thus, according to the load-balancing technique described above, all remaining electronic devices that have not transmitted will transmit their data at the end of the total time period. Accordingly, the method 500 described above minimizes the possibility that all electronic devices initiate transmission of data simultaneously, but at the same time, may possibly provide all electronic devices with equal opportunity to transmit their data.

Figure 6:
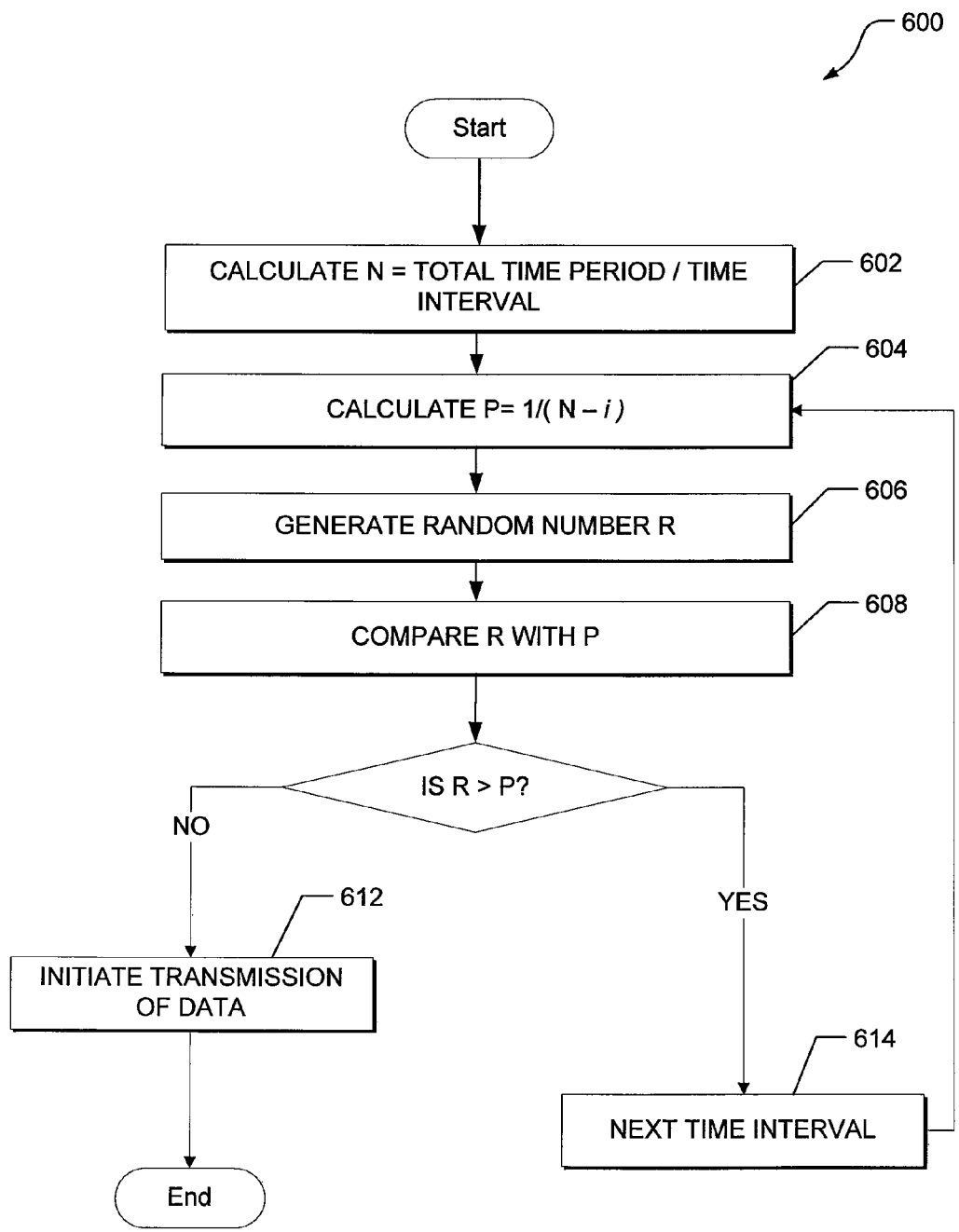
FIG. 6 depicts a flow diagram of a detailed method, in accordance with another embodiment, for transmitting data to a different electronic device.

FIG. 6 depicts a flow diagram of a detailed method 600, in accordance with another embodiment, for transmitting data to a different electronic device. In this method 600, a number can be identified at 602 by calculating a number N based on a ratio of a total time period to a time interval:

$$N = \frac{\text{Total Time Period}}{\text{Time Interval}}$$

As an example, client computing devices are configured to transmit data to a particular server computing device within a two-hour window. Within the two-hour window, each client computing device is configured to attempt to make a transmission at 5 minute intervals. The number N is then equal to 24 (120 minutes/5 minutes).

A probability P is then calculated at 604 based on an inverse of the ratio or number N calculated above. However, in this embodiment, the probability is based on an inverse of a difference between the number N and an increasing number i:

$$P = \frac{1}{N-i}$$

where i is a number that increases at a next interval. For example, the increasing number i may be selected from a sequence of numbers i=1, 2, 3, 4, 5, . . . where i=1 is associated with 5 minute time interval, i=2 is associated with a next 5 minute time interval (total 10 minutes), i=3 is associated with a next, next 5 minute time interval (total 15 minutes), and so on. For example, if the number N is 12 for the first 5 minute time interval and i=1 for the first five minute interval, then the probability P is 0.09 (1/(12−1)). For a next 5 minute time interval with i=2 assigned to this next 5 minute time interval, then the probability P is 0.10 (1/(12−2)).

A random number R is generated at 606 and this random number R is compared with the probability P at 608. If the random number R is less than or equal to the probability P, then transmission of data is initiated at 612 and the method operation ends. However, if the random number R is greater than the probability P, then the transmission of data is aborted and the calculations of the probability P and the random number R are repeated for a next time interval at 614 until the end of the total time period.

It should be noted that as the method operations 604 repeat for a next time interval, the probability P will also increase as it approaches the total time period such that all remaining electronic devices that have not transmitted will transmit their data at the end of the total time period. Accordingly, the method 600 described above minimizes the possibility that all electronic devices initiate transmission of data simultaneously, but at the same time, may provide all electronic devices with equal opportunity to transmit their data.

Figure 7:
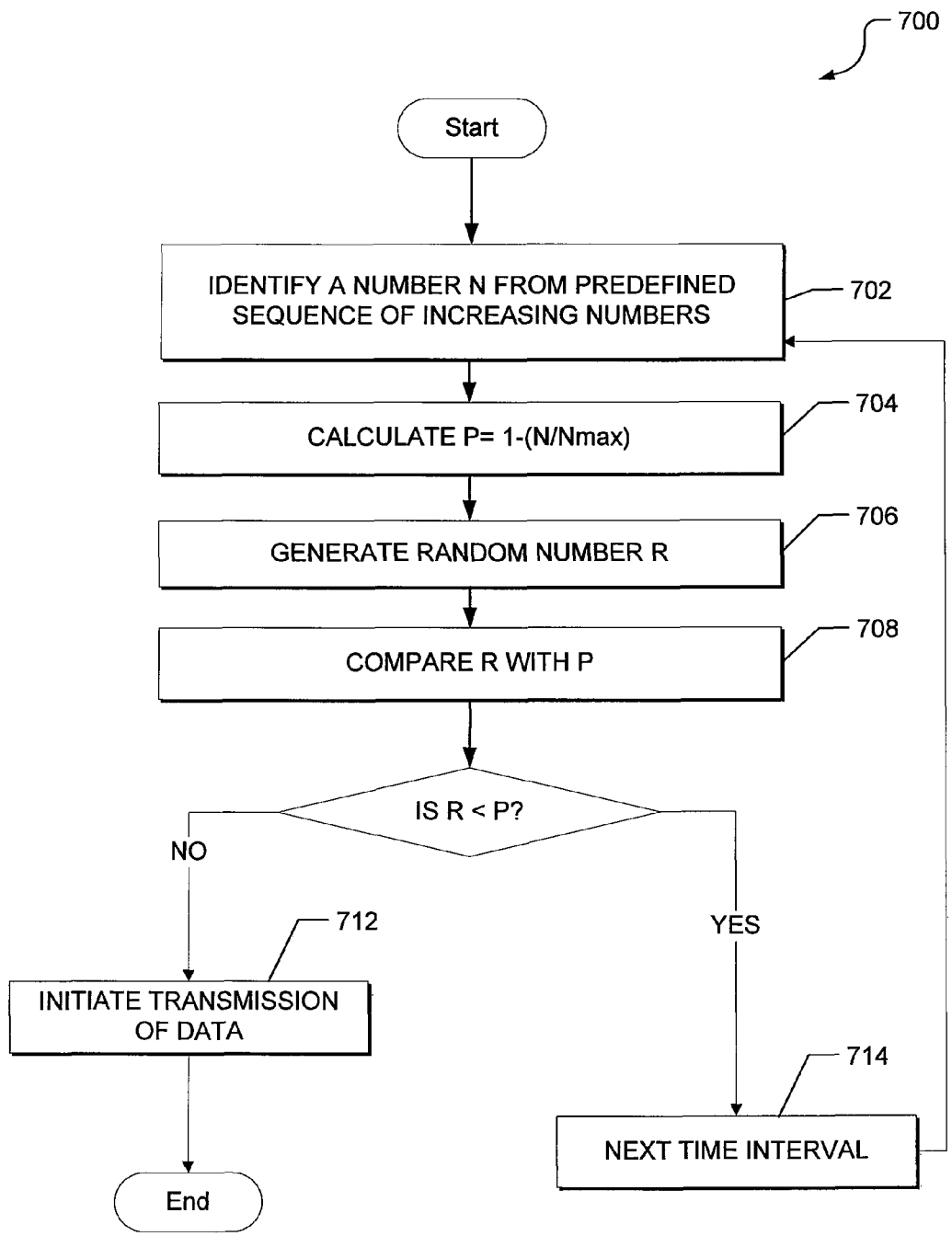
FIG. 7 depicts a flow diagram of a detailed method, in accordance with yet another embodiment, for transmitting data to a different electronic device.

FIG. 7 depicts a flow diagram of a detailed method 700, in accordance with yet another embodiment, for transmitting data to a different electronic device. Here, a number N can be identified at 702 from a predefined sequence of increasing numbers. As an example, the predefined sequence of increasing numbers can be i=1, 2, 3, 4, 5, 6, 7, 8 . . . $N_{max}$, where each increasing number i is associated with a particular time interval and $N_{max}$ is the total number. In another example, the predefined sequence of increasing numbers can be i=5, 10, 15, 20, 25, 30 . . . $N_{max}$, where each increasing number is associated with a particular time interval. In yet another example, the predefined sequence of increasing numbers can be i=3, 8, 10, 11, 14, 19 . . . $N_{max}$, where each increasing number is associated with a particular time interval.

A probability P is then calculated at 704 based on an inverse of the number N identified above:

$$P = 1 - \frac{N}{N_{Max}}$$

For example, a predefined sequence of increasing numbers i=1, 2, 3, 4, 5, . . . $N_{max}$ is provided, and each increasing number is associated with a 5 minute time interval. At the first 5 minute time interval, the probability P is $(1-1/N_{max})$. At the next 5 minute interval (total 10 minutes), the probability P is $(1-2/N_{max})$. At the 5 minute interval thereafter (total 15 minutes), the probability P is $(1-3/N_{max})$.

Essentially, the method operation 704 coverts the number N into a fraction. As a result, in an alternative embodiment of method 700, the method operation 704 may be omitted. Instead, the predefined sequence can be initially defined as a sequence of decreasing numbers in the form of fractions. For example, a predefined sequence of decreasing numbers i=0.9, 0.8, 0.7, 0.6, 0.5 . . . can be provided, and each decreasing number is associated with a 104 minute time interval. In another example, a predefined sequence of decreasing numbers i=0.8, 0.6, 0.4, 0.2 . . . can be provided, and each decreasing number is associated with a 10 minute time interval. In yet another example, a predefined sequence of decreasing numbers i=0.9, 0.8889, 0.875, 0.8571428, 0.833, 0.8, 0.75, 0.6667, 0.5, 1 can be provided, and each decreasing number is associated with a 15 minute interval.

Still referring to FIG. 7, a random number R is generated at 706, and the probability P is compared with the random number R at 708. If the random number R is greater than or equal to the probability P, then transmission of data is initiated at 712 and the method operation ends. However, if the random number R is less than the probability P, then the transmission of data is aborted and the identification or calculation of the number N, probability P, and random number R are repeated for a next time interval at 714 until the end of the total time period. For example, if the random number R is 0.5 and the calculated probability P is 1, then the comparison will identify that R is less than P and accordingly, abandon transmission of the data. However, if the random number R is 0.4 and the calculated probability P is 0.3, then the comparison will identify that R is larger than P and accordingly, initiate transmission of the data to a different electronic device.

It should be noted that as the method operations 702-708 repeat for a next time interval (or next number in the predefined sequence), the probability P will decrease as it approaches the total time period. At the end of the total time period, the probability P will be 0. If the random number R is distributed between 0 and 1 (or 0<R<1), then the random number R will always be greater than the probability P=0 at the end of the total time period. Thus, according to the load-balancing technique described above, all remaining electronic devices that have not transmitted will transmit their data at the end of the total time period. Accordingly, the method 700 described above also minimizes the possibility that all electronic devices initiate transmission of data simultaneously, but at the same time, may possibly provide all electronic devices with equal opportunity to transmit their data.

Figure 8:
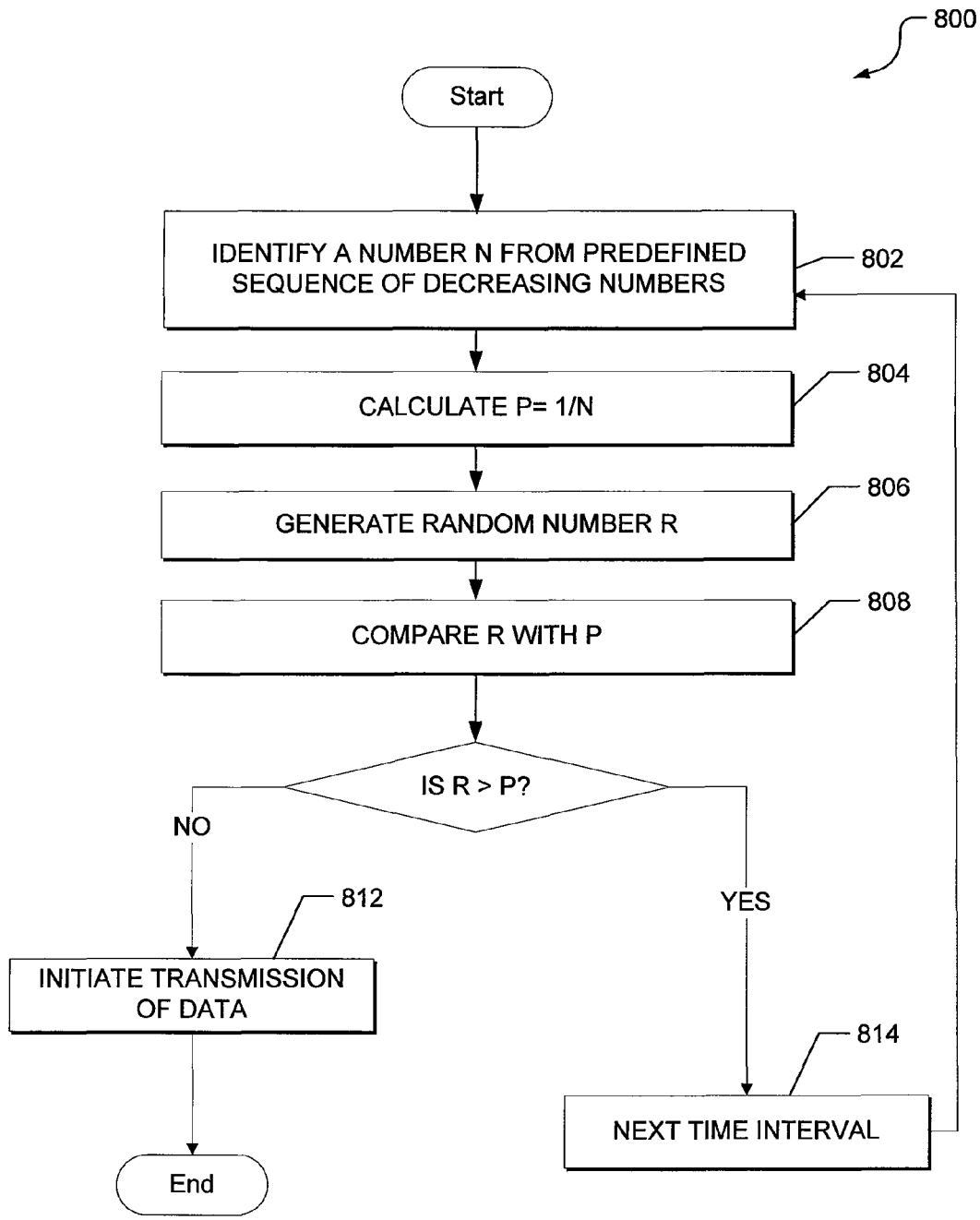
FIG. 8 depicts a flow diagram of a detailed method, in accordance with an alternative embodiment, for transmitting data to a different electronic device.

FIG. 8 depicts a flow diagram of a detailed method 800, in accordance with an alternative embodiment, for transmitting data to a different electronic device. Here, a number N can be identified at 802 from a predefined sequence of decreasing numbers. As an example, the predefined sequence of decreasing numbers can be i=100, 99, 98, 97 . . . $N_{min}$, where each decreasing number i is associated with a particular time interval and $N_{min}$ is the last number of the sequence, such as 1. In another example, the predefined sequence of decreasing numbers can be i=30, 25, 20, 15, 10 . . . $N_{min}$, where each decreasing number is associated with a particular time interval. In yet another example, the predefined sequence of decreasing numbers can be i=78, 23, 20, 15, 10, 5 . . . $N_{min}$, where each decreasing number is associated with a particular time interval.

A probability P is then calculated at 804 based on an inverse of the number N identified above. For example, a predefined sequence of decreasing numbers i=10, 9, 8, 7, 6, 5 . . . $N_{min}$, is provided, and each decreasing number is associated with a 15 minute time interval. At the first 15 minute time interval, the probability P is 0.10 (1/10). At the next 15 minute interval (total 30 minutes), the probability P is 0.11 (1/9). At the 15 minute interval thereafter (total 45 minutes), the probability P is 0.125 (1/8).

Again, the method operation 804 coverts the number N into a fraction. As a result, in an alternative embodiment of method 800, the method operation 804 may be omitted. Instead, the predefined sequence can be initially defined as a sequence of increasing numbers in the form of fractions. For example, a predefined sequence of increasing numbers i=0.1, 0.2, 0.3, 0.4, 0.5 . . . $N_{max}$ can be provided, and each increasing number can be associated with a 10 minute time interval. In another example, a predefined sequence of increasing numbers i=0.2, 0.3, 0.6, 0.7, 0.9 . . . $N_{max}$ can be provided, and each increasing number can be associated with a 26 minute time interval.

Still referring to FIG. 8, a random number R is generated at 806, and the probability P is compared with the random number R at 808. If the random number R is less than or equal to the probability P, then transmission of data is initiated at 812 and the method operation ends. However, if the random number R is greater than the probability P, then the transmission of data is aborted and the identification or calculation of the number N, probability P, and random number R are repeated for a next time interval (or next number in the predefined sequence) at 814 until the end of the total time period. For example, if the random number R is 0.4 and the calculated probability P is 0.2, then the comparison will identify that R is greater than P and accordingly, abandon transmission of the data. However, if the random number R is 0.8 and the calculated probability P is 0.9, then the comparison will identify that R is less than P and accordingly, initiate transmission of the data to a different electronic device.

It should be noted that as the method operations 802-808 repeat for a next time interval (or next number in the predefined sequence), the probability P will increase as it approaches the total time period. At the end of the total time period, the probability P may be 1. If the random number R is distributed between 0 and 1, then the random number R will always be less than the probability P=1 at the end of the total time period. Thus, according to the load-balancing technique described above, all remaining electronic devices that have not transmitted will transmit their data at the end of the total time period. Accordingly, the method 800 described above also minimizes the possibility that all electronic devices initiate transmission of data simultaneously, but at the same time, may possibly provide all electronic devices with equal opportunity to transmit their data.

Figure 9:
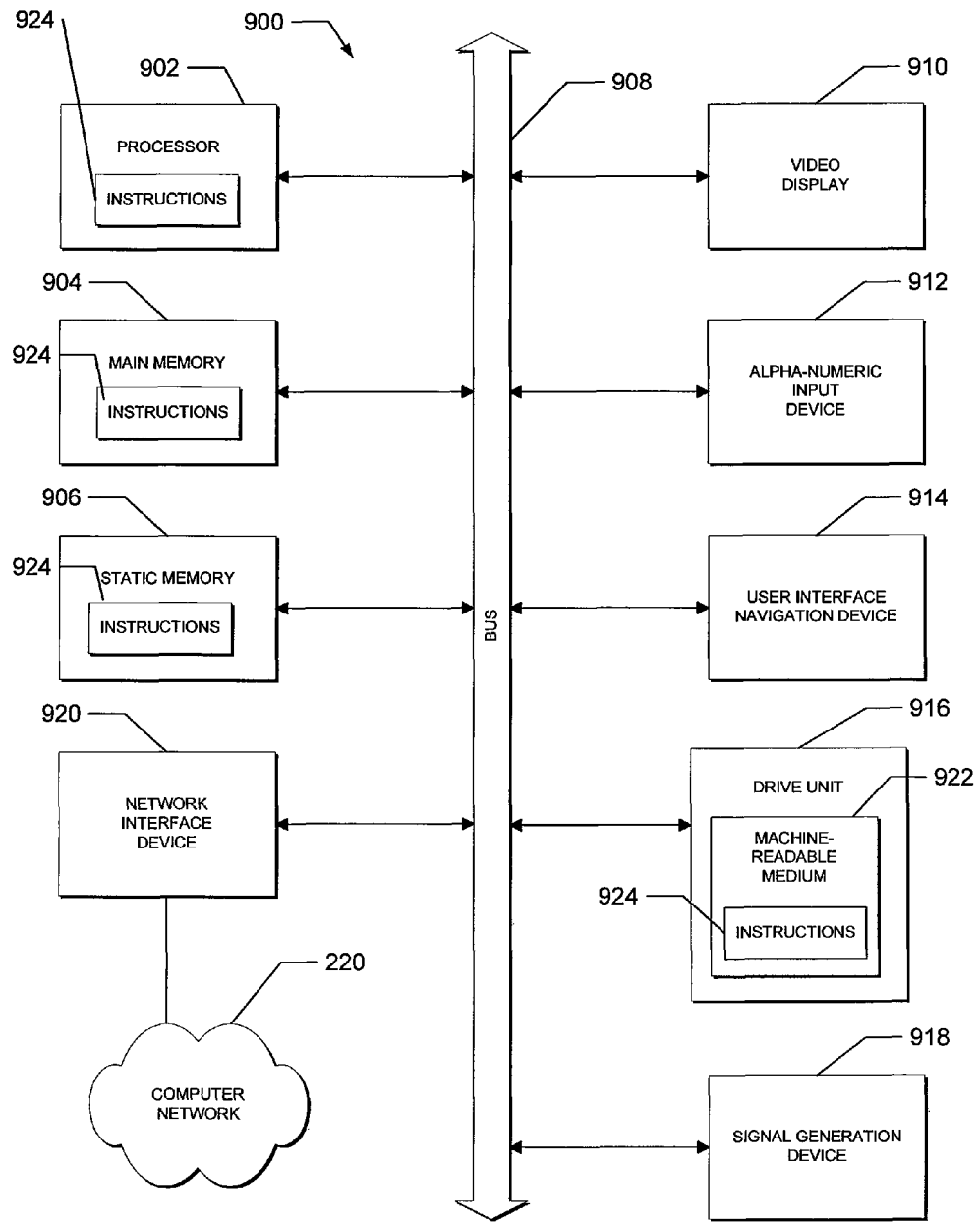
FIG. 9 depicts a block diagram of a machine in the example form of a computing device within which may be executed a set of instructions for causing the machine to perform any one or more of the methodologies discussed herein.

FIG. 9 depicts a block diagram of a machine in the example form of a computing device 900 within which may be executed a set of instructions for causing the machine to perform any one or more of the methodologies discussed herein. In alternative embodiments, the machine operates as a standalone electronic device or may be connected (e.g., networked) to other machines. In a networked deployment, the machine may operate in the capacity of a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 900 includes a processor 902 (e.g., a central processing unit (CPU), a graphics processing unit (GPU) or both), a main memory 904 (e.g., random access memory), and static memory 906 (e.g., static random-access memory), which communicate with each other via bus 908. The computing device 900 may further include video display unit 910 (e.g., a plasma display, a liquid crystal display (LCD) or a cathode ray tube (CRT)). The computing device 900 also includes an alphanumeric input device 912 (e.g., a keyboard), a user interface (UI) navigation device 914 (e.g., a mouse), a disk drive unit 916, a signal generation device 918 (e.g., a speaker), and a network interface device 920.

The disk drive unit 916 (a type of non-volatile memory storage) includes a machine-readable medium 922 on which is stored one or more sets of data structures and instructions 924 (e.g., software) embodying or utilized by any one or more of the methodologies or functions described herein. The data structures and instructions 924 may also reside, completely or at least partially, within the main memory 904 and/or within the processor 902 during execution thereof by computing device 900, with the main memory 904 and processor 902 also constituting machine-readable, tangible media.

The data structures and instructions 924 may further be transmitted or received over a computer network 220 via network interface device 920 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 900) or one or more hardware modules of a computer system (e.g., a processor 902 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 902 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 902 configured using software, the general-purpose processor 902 may be configured as respective different hardware modules at different times. Software may accordingly configure a processor 902, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at, different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902, not only residing within a single machine, but deployed across a number of machines. In some example embodiments, the processors 902 may be located in a single location (e.g., within a home environment, an office environment or as a server farm), while in other embodiments the processors 902 may be distributed across a number of locations.

While the embodiments are described with reference to various implementations and exploitations, it will be understood that these embodiments are illustrative and that the scope of the embodiments is not limited to them. In general, techniques for transmitting data may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method comprising:
   identifying a number from a sequence of numbers, each number from the sequence being associated with a time interval, the time interval associated with at least one number in the sequence being different from the time interval associated with another number in the sequence, the identifying including:
      calculating a ratio of a remaining time period and the time interval, and
      calculating the number based on an inverse of the ratio;
   generating a random number;
   comparing the identified number with the random number; and
   in reference to the time interval associated with the identified number, transmitting the data to an electronic device based on the comparison.

2. The method of claim 1, wherein the transmitting of the data is initiated at the time interval.

3. The method of claim 1, wherein the transmitting of the data is initiated based on the random number being less than or equal to the identified number.

4. The method of claim 1, wherein the transmitting of the data is aborted based on the random number being greater than the identified number.

5. A non-transitory machine-readable medium that stores instructions, which, when performed by a machine, cause the machine to perform operations comprising:
   identifying a number from a sequence of numbers, each number from the sequence being associated with a time interval, the time interval associated with at least one number in the sequence being different from the time interval associated with another number in the sequence, the identifying including:
      calculating a ratio of a total time period and the time interval,
      calculating a difference between the ratio and an increasing number associated with the time interval, and
      calculating the number based on an inverse of the difference;
   generating a random number;
   comparing the identified number with the random number; and
   at the time interval associated with the identified number, initiating, transmission of data to a different machine based on the comparison.

6. The non-transitory machine-readable medium of claim 5, wherein the sequence is a predefined sequence of increasing numbers, wherein the method further comprising repeating each of the operations for an increasing next number in the sequence of increasing numbers at a next time interval.

7. The non-transitory machine-readable medium of claim 6, wherein the transmission of the data is initiated based on the random number being less than or equal to the number from the sequence.

8. The non-transitory machine-readable medium of claim 6, wherein the transmission of the data is aborted based on the random number being greater than the number from the sequence.

9. The non-transitory machine-readable medium of claim 5, wherein the sequence is a predefined sequence of decreasing numbers, wherein the method further comprising repeating each of the operations for a next decreasing number in the sequence of decreasing numbers at a next time interval.

10. The non-transitory machine-readable medium of claim 9, wherein the transmission of the data is initiated based on the random number being greater than or equal to the number from the sequence.

11. The non-transitory machine-readable medium of claim 9, wherein the transmission of the data is aborted based on the random number being less than or equal to the number from the sequence.

12. A computing device comprising:
   at least one processor; and
   a memory in communication with the at least one processor, the memory being configured to store a transmission initiator module that is executable by the at least one processor, the transmission initiator module having instructions that when executed by the at least one processor, cause operations to be performed, the operations comprising:
      identifying a number from a sequence of numbers, each number from the sequence being associated with a. time interval, the time interval associated with at least one number in the sequence being different from the time interval associated with another number in the sequence,
      calculating a ratio of a remaining time period and the time interval associated with the number of the sequence of numbers;
      calculating a probability based on an inverse of the ratio;
      generating a random number;
      comparing the probability with the random number; and
      at the time interval, initiating transmission of the data to a different computing device based on the comparison.

13. The computing device of claim 12, wherein the transmission of the data is initiated based on the random number being less than or equal to the calculated probability.

14. the computing device of claim 12, wherein the transmission of the data is aborted based on the random number being greater than the calculated probability.

15. The computing device of claim 12, further comprising calculating the remaining time period based on a difference between an elapsed time and a total time period.

16. The computing device of claim 12, wherein the calculated probability increases with increase in time.

17. The computing device of claim 12, wherein the calculated probability decreases with increase in time.

18. The computing device of claim 12, wherein the time interval is a length of time that is used as a reference in the initiating transmission of the data.

* * * * *